Aug. 25, 1931. A. B. RAY 1,820,030
APPARATUS FOR THE REMOVAL OF ODORS FROM AIR
Filed Feb. 7, 1928
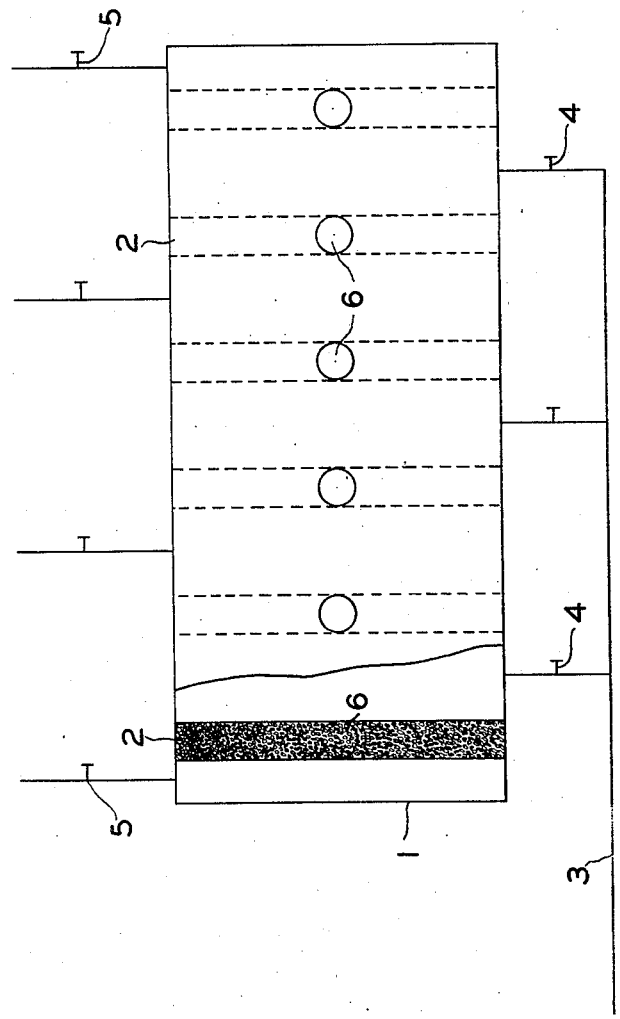
INVENTOR:
Arthur B. Ray,
BY
ATTORNEYS.

Patented Aug. 25, 1931

1,820,030

UNITED STATES PATENT OFFICE

ARTHUR B. RAY, OF BAYSIDE, NEW YORK, ASSIGNOR TO NATIONAL CARBON COMPANY, INC., A CORPORATION OF NEW YORK

APPARATUS FOR THE REMOVAL OF ODORS FROM AIR

Application filed February 7, 1928. Serial No. 252,654.

REISSUED

This invention relates to apparatus for the removal of odoriferous substances from air or other gases and is especially adaptable for use in meat packing houses where the waste material from butchered animals is treated for commercial disposal.

Much progress has been made in the abatement of the more serious of the stenches which were formerly emitted from the parts of meat packing houses in which the waste animal matter is treated. For example the fat is now rendered from the non-edible portions of the carcasses in closed kettles and means are provided for condensing a considerable portion of the obnoxious odors emitted. In this manner one of the principal sources of atmospheric contamination is removed to a great extent. Some of the fixed gaseous odors however still escape from the rendering apparatus into the surrounding room. Also, materials of objectionable odor are still handled in open vessels, as when the offal is being macerated, washed, and charged into the rendering kettles, and when the cooked material is discharged from the kettles. In this manner the very large volume of air which passes through the work rooms becomes contaminated with a relatively small but offensive content of odoriferous substances.

The use of closed vessels for the more objectionable stench-producing operations brought about so much improvement that for a time there was a tendency to tolerate the less serious stenches still emitted. As sanitary standards have been raised, however, and as residence districts have drawn closer to existing plants of this character, the necessity for more complete stench abatement has become acute. No means has heretofore been available for this purpose, largely because of the quantity of air which must be deodorized to render a plant quite unobjectionable.

In accordance with the present invention, the odoriferous substances are removed from the contaminated air by contacting the latter with granular high-retentivity activated carbon. By "activated carbon" I refer to such materials as are described in the U. S. patents to Newcomb K. Chaney No. 1,497,543 and No. 1,497,544, both dated June 10, 1924, and I prefer to use the more active of the materials which are there described.

In order to process the air from a large meat packing plant in an apparatus of reasonable size, it is apparent that the air must flow through the deodorizing apparatus at high velocity. To force the air at high velocity through beds of granular carbon requires high pressures and large expenditure of power unless the carbon beds are very thin. Thin carbon beds in conjunction with a high air velocity reduce the time of contact of the air with the carbon to a very small interval, and it was questionable whether, under economically feasible conditions, the air would be sufficiently deodorized. In this connection the low concentration of odoriferous substances in the air entering the purifying apparatus is less significant that the much lower concentration of residual odors which must be attained in the air leaving the apparatus. The concentrations of the substances dealt with are infinitesimal as compared with the concentrations of gasoline, solvent vapors and other materials remaining in gases after they have been passed through activated carbon in prior processes. Even where activated carbon is used in gas masks, a residual toxic content readily detectable by chemical methods is permissible in the inhaled air, and the velocity of the air through the carbon in a gas mask does not approach that necessary in the deodorization of the air from certain sections of meat packing houses. Nevertheless, I have been able to completely deodorize contaminated air from packing houses with great success by the use of the apparatus now to be described.

Reference is to be made to the accompanying drawing in which the single figure is a top view of a suitable odor-removing apparatus with one end cut away to show the interior construction.

In this drawing I show a steel tank 1, the interior of which is divided into a number of compartments by thin vertical layers 2 of activated carbon held in place by any suitable means such as perforated metal plates or screens. The odor-laden air is passed by a suitable blower into the air duct 3 and thence through the inlet valves 4 into the interior of the tank. The outlet valves 5 on the opposite side of the tank are so arranged with reference to the inlet valves that all of the air must pass through one or more layers of activated carbon before it is finally released to the atmosphere. Preferably the air passes through but one layer of carbon. Suitable openings 6 are provided on the top and bottom of each of the carbon containers for charging and discharging as desired.

After the carbon has been in service for several months and its deodorizing power has become nearly exhausted, one bed of carbon at a time may be removed from the tank and revivified. During this time the necessary valves leading to and from the proper section of the tank are closed so that no odor-laden air can escape to the atmosphere. After one batch of carbon has been revivified it is again placed in the tank and another batch is removed for revivification so that the continuous operation of the deodorizing process is not hindered. A satisfactory method of revivifying the carbon is to heat it with steam to a temperature of about 300° C. If objectionable materials are driven out of the carbon by the steam they may be partially condensed and passed with the water condensate into the sewer or burned.

The particular location of the apparatus in the plant is a matter of convenience but it is advisable to place it so that the carbon may be removed when necessary for revivifying with the least possible effort. The discharge holes for the respective beds are so arranged that the carbon may be passed from the vertical containers by gravity directly into the revivifying tank or into a suitable conveyor for transfering it to said tank. The apparatus of my invention may of course be used in conjunction with other odor abatment apparatus. For example in cases where spray chambers are already in use my apparatus may be used in series with it and the exhaust air from the spray chamber passed directly into the carbon where the deodorizing operation is completed. By previously spraying the air with water it appears that ammonia, dust, and possibly some of the volatile odoriferous compounds are removed and the active life of the carbon may thus be considerably prolonged.

While convenient for some purposes it is not absolutely necessary to enclose the carbon beds in a metal container since the main object of the apparatus is to insure passage of the odor-laden air through the activated carbon. For instance the thin vertical beds of carbon may be placed in a brick chamber or an ordinary room and all of the air from the work rooms passed into this chamber or treating room and thence by suitable dampers through the layers of activated carbon and into the atmosphere.

In determining the amount of activated carbon necessary for completely deodorizing the air consideration must be given to the volume of air which it is necessary to treat per minute with a view to the fact that the thickness and area of the carbon bed will determine the power required to force the air through it. I have found that with very thin beds varying from 4 to 8 inches in thickness air may be passed through at the rate of 50 to 100 feet per minute without excessive pressure and with complete removal of all odoriferous substances.

In a particular application of the present invention approximately 30,000 cubic feet of the odor-laden air per minute are passed by two suction blowers into the apparatus. The thickness of the carbon bed which it is feasible to use under these conditions is about 6 inches and the linear velocity through the bed for effective removal of odors is approximately 50 feet per minute. In order to obtain this velocity a total carbon bed area of about 600 square feet must be provided. With this total area divided into smaller beds and arranged as already described the pressure drop through the activated carbon will be approximately equivalent to 3 inches of water.

The ability of activated carbon to adsorb various gases, vapors and other substances is well known, but under the conditions as described I believe that the actual adsorptive power of the carbon is not entirely responsible for the results obtained. It has been observed and is disclosed in the patents and literature that activated carbon acts as a catalyst in certain reactions, and the ease with which many odoriferous compounds may be oxidized has long been recognized. I therefore believe that the remarkable efficiency of the carbon for the purpose in question, in which the conditions for adsorption are decidedly unfavorable, may be attributed in part to its catalytic action by which the odoriferous material is actually oxidized and destroyed.

So far as I am aware my apparatus is the first to be designed to meet the combination of requirements which includes the treatment of a very large volume of gas in inexpensive equipment, a small expenditure of power, and substantially complete removal of a volatile impurity from the gas. For such purposes a bed of granular carbon of a thickness small in comparison with its area, and sufficiently small to permit the passage of gas with a velocity of at least 50 feet per minute under a pressure equivalent to 3 inches of water has unique advantages.

While this invention is especially adaptable for use in meat packing houses as shown by the description herein, it is apparent that with slight modifications the same apparatus might be used for practically any odor abatement purposes requiring the purification of large volumes of air or other gases. It would likewise be useful in removing impurities other than odors present in small concentration in various manufacturing operations where said impurities are injurious to the product being made.

I claim:

1. In an odor removing apparatus of the character described comprising a metal tank, the interior of which is divided into a plurality of compartments by means of thin vertical beds of activated carbon arranged in spaced relation therein, inlet valves for the air to be treated connected with alternate compartments, outlet valves connected with the remaining compartments, and means provided for individually charging and discharging each of said carbon beds by gravity.

2. In a system for preventing the dissemination of odors in large volumes of air, a plurality of thin vertical beds of activated carbon arranged in spaced relation in a metal container, inlet valves on one side of said container, outlet valves on the opposite side, said valves connected to the container in a manner whereby the air to be treated must pass through at least one of said carbon beds before being released to the atmosphere, and means provided for individually charging and discharging by gravity each carbon bed without interrupting the absorbing process.

In testimony whereof, I affix my signature.

ARTHUR B. RAY.